United States Patent
Polania Castro

(10) Patent No.: US 11,584,252 B2
(45) Date of Patent: Feb. 21, 2023

(54) SYSTEMS AND METHODS FOR CHAINING DATA BETWEEN ELECTRIC VEHICLES AND ELECTRIC VEHICLE STATIONS

(71) Applicant: HONDA MOTOR CO., LTD., Tokyo (JP)

(72) Inventor: Boris Hernan Polania Castro, Cupertino, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 481 days.

(21) Appl. No.: 16/540,701

(22) Filed: Aug. 14, 2019

(65) Prior Publication Data

US 2021/0046842 A1  Feb. 18, 2021

(51) Int. Cl.
  *B60L 53/00* (2019.01)
  *B60L 53/66* (2019.01)
  *B60L 53/65* (2019.01)

(52) U.S. Cl.
  CPC .............. *B60L 53/66* (2019.02); *B60L 53/65* (2019.02); *B60L 2240/32* (2013.01); *B60L 2240/60* (2013.01)

(58) Field of Classification Search
  CPC ...... B60L 53/66; B60L 53/65; B60L 2240/60; Y02T 90/12; Y02T 90/14; Y02T 90/16; Y02T 90/167; Y04S 30/14
  See application file for complete search history.

(56) References Cited

U.S. PATENT DOCUMENTS

| | | | |
|---|---|---|---|
| 8,912,753 B2 * | 12/2014 | Pudar | B60L 53/65 320/109 |
| 9,024,571 B2 * | 5/2015 | Uyeki | H02J 7/0013 320/101 |
| 9,112,382 B2 * | 8/2015 | Paul | B60L 53/65 |
| 9,505,318 B2 * | 11/2016 | Hendrix | B60L 58/12 |
| 9,626,823 B2 | 4/2017 | Saito et al. | |
| 9,689,692 B2 | 6/2017 | Takehara et al. | |
| 9,940,840 B1 * | 4/2018 | Schubert | G01C 21/3407 |
| 10,112,497 B2 * | 10/2018 | Saito | B60L 53/67 |
| 10,124,682 B2 * | 11/2018 | Tsuchiya | B60L 53/14 |
| 10,370,102 B2 * | 8/2019 | Boykin | H04N 5/23206 |
| 10,580,311 B2 * | 3/2020 | Schmalzried | B60L 53/67 |
| 10,598,503 B2 * | 3/2020 | Ellison | G01C 21/3469 |
| 10,691,138 B2 * | 6/2020 | Antunes Marques Esteves | B60L 53/00 |
| 10,783,600 B2 * | 9/2020 | Zachary | H04W 12/10 |
| 10,913,373 B2 * | 2/2021 | Waffner | H02J 7/04 |

(Continued)

FOREIGN PATENT DOCUMENTS

| | | | | | |
|---|---|---|---|---|---|
| CN | 102045340 A | | 5/2011 | | |
| CN | 108470238 A | * | 8/2018 | ....... | G06Q 10/06312 |

(Continued)

*Primary Examiner* — Naum Levin
(74) *Attorney, Agent, or Firm* — ArentFox Schiff LLP

(57) ABSTRACT

Systems and methods for chaining data between electric vehicles and electric vehicle stations are disclosed. In an example, an electric vehicle can share a charging profile with a charging station, and the charging station can share collective charging data with the electric vehicle. The collective charging data can include charging profile data electric vehicles which have previously charged at the charging station. Based on the shared data both the electric vehicle and the charging station can perform one or more functions based on the shared data.

18 Claims, 7 Drawing Sheets

(56) References Cited

U.S. PATENT DOCUMENTS

| | | | |
|---|---|---|---|
| 10,926,659 B2 * | 2/2021 | Lee .......................... | B60L 53/63 |
| 10,953,767 B2 * | 3/2021 | Loghavi ........... | G06Q 10/06315 |
| 2010/0013808 A1 | 6/2010 | Ichikawa et al. | |
| 2015/0291047 A1 * | 10/2015 | Saito ....................... | B60L 53/67 |
| | | | 320/109 |
| 2017/0015210 A1 * | 1/2017 | Juhasz .................... | B60L 53/66 |
| 2018/0202825 A1 | 7/2018 | You et al. | |
| 2018/0373268 A1 * | 12/2018 | Antunes Marques Esteves .......... | |
| | | | B60L 58/12 |
| 2019/0205842 A1 * | 7/2019 | Starns ................ | G06Q 30/0639 |
| 2021/0380012 A1 * | 12/2021 | Tsuda ...................... | B60L 53/66 |

FOREIGN PATENT DOCUMENTS

| | | | | |
|---|---|---|---|---|
| CN | 108573317 A | | 9/2018 | |
| CN | 110198031 A | * | 9/2019 | ................ H02J 3/00 |
| CN | 108494034 B | * | 11/2021 | ................ H02J 3/32 |
| CN | 108199100 B | * | 12/2021 | .............. B60L 53/60 |
| DE | 102018221933 A1 | * | 11/2019 | |
| EP | 2353924 A2 | | 8/2011 | |
| JP | 2018117500 A | * | 7/2018 | |
| WO | WO-2013056990 A2 | * | 4/2013 | .............. B60L 53/14 |
| WO | WO-2019138668 A1 | * | 7/2019 | ......... G05B 19/4185 |
| WO | WO-2020173820 A1 | * | 9/2020 | .............. H02J 13/00 |

* cited by examiner

SYSTEMS AND METHODS FOR CHAINING DATA BETWEEN ELECTRIC VEHICLES AND ELECTRIC VEHICLE STATIONS

TECHNICAL FIELD

Aspects of the present disclosure relate generally to electric vehicles and electric vehicle stations, and more particularly, to systems and methods for chaining data between electric vehicles and electric vehicle stations.

BACKGROUND

Electric vehicles have been gaining popularity as a primary mode of transportation, and as such, many public places have installed charging stations to allow drivers to charge electric vehicles while parked. In this regard, not only can the drivers charge their electric vehicles at home, but can also charge at a parking spot at an office, shopping mall, city center, or other areas having parking spaces with installed charging stations. Typically, electric vehicle systems operate based on information provided by the user of the electric vehicle or from information provided from an electric vehicle manufacturer. Further, charging stations typically operate on minimal information (e.g., power level) provided by an electric vehicle, when connected for charging an electric vehicle. However, both electric vehicles and charging stations can benefit from operating based on information, data and functions relating to each other and other electric vehicles.

Therefore, there is a need in the art for systems and methods for chaining data between electric vehicles and electric vehicle stations.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for chaining data by an electric vehicle is provided. The method can include determining a charging profile corresponding to use of the electric vehicle. The method can also include receiving an indication that the electric vehicle is coupled with a charging station to charge the electric vehicle. The method can further include transmitting the charging profile to the charging station. The method can include receiving collective station data, the collective station data including, for example, charging information related to the charging station and/or previous electric vehicles that exchanged data with the charging station, from the charging station. The method can also include performing, on the electric vehicle, one or more functions corresponding to the collective station data.

In another example, a vehicle is provided that includes a memory storing instructions, and a processor coupled with the memory. The processor can be configured to determine a charging profile corresponding to use of the electric vehicle. The processor also can be configured to receive an indication that the electric vehicle is coupled with a charging station to charge the electric vehicle. The processor can further be configured to transmit the charging profile to the charging station. The processor can be configured to receive collective station data from the charging station. The processor also can be configured to perform one or more functions corresponding to the collective station data.

In a further example, a method for chaining data by a charging station is provided. The method can include receiving an indication that an electric vehicle is coupled with the charging station to charge the electric vehicle. The method can also include receiving a charging profile from the electric vehicle. The method can further include transmitting collective station data to the electric vehicle. The method can include performing, on the charging station, one or more functions corresponding to the charging profile.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative variations when read in conjunction with the accompanying drawings, wherein:

DETAILED DESCRIPTION

Figure 1:
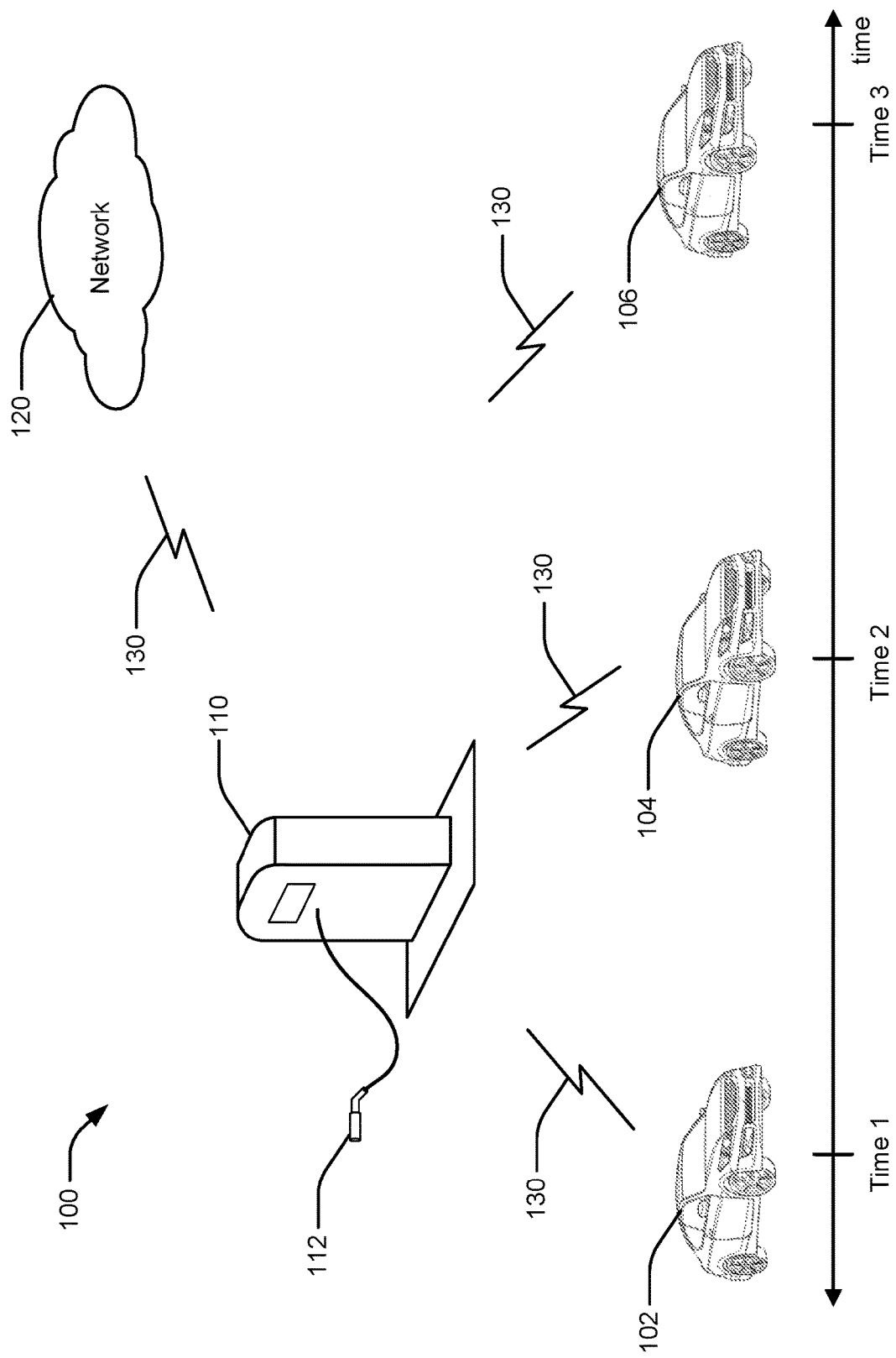
FIG. 1 illustrates a conceptual view of an example operating environment, according to one aspect of the disclosure.

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "charging profile," as used herein, can include a collection of parameters and corresponding data values related to charging an electric vehicle. The charging profile can be stored in a memory of the electric vehicle and/or at a remote location, and can include parameters such as a charging location at which the electric vehicle can charge a battery, a start time and/or duration of one or more charging operations performed for the electric vehicle at the charging location, and/or similar parameters.

The terms "vehicle" or "electric vehicle," as used herein, can refer to any moving vehicle that is capable of carrying one or more human occupants and is powered by an electric battery and/or any form of energy that can be recharged at a charging station. The term "vehicle" can include, but is not limited to: cars, trucks, vans, minivans, SUVs, motorcycles, scooters, boats, personal watercraft, and aircraft.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Turning now to the figures, example aspects are depicted with reference to one or more components described herein, where components in dashed lines can be optional.

FIG. 1 shows a conceptual view of an operating environment 100 for a plurality of electric vehicles 102, 104, 106 and a charging station 110, according to aspects of the present disclosure. The charging station 110 can include a plug 112 configured to connect to an electric vehicle (e.g., 102-106) and provide power to charge a battery. As shown the plug 112 can extend from the charging station 110 to connect to the electric vehicle (e.g., 102-106). However, the present disclosure is not limited to this type of plug 112 and in other examples, the plug can be on the electric vehicle and extend to the charging station 110.

As shown by FIG. 1, the electric vehicles 102, 104, and 106 can sequentially charge batteries at the charging station 110 by connecting to the plug 112. In other words, the electric vehicle 102 charges at the charging station 110 at Time 1, the electric vehicle 104 charges at the charging station 110 at Time 2, and the electric vehicle 106 charges at the charging station 110 at Time 3, where Time 1<Time 2<Time 3. For purposes of the present disclosure, the electric vehicles 102, 104, and 106 can be interchangeably referred to as a previous electric vehicle, as a present electric vehicle, and as a next electric vehicle.

In an aspect, each of the electric vehicles 102, 104, and 106 can be configured to communicate with the charging station 110 via a communications link 130. Examples of the communications link 130 can include, one or more of Bluetooth®, Wi-Fi, IEEE 802.11, or other wireless communications technology, or a wired communications technology.

For brevity, an explanation of a charging operation for the electric vehicle 104 will be described below, and the present application assumes that each of the electric vehicles 102 and 106 is configured to perform similar aspects as the electric vehicle 104.

In an example, when the electric vehicle 104 connects to the charging station 110 via the plug 112, the electric vehicle 104 can determine whether the electric vehicle 104 will communicate with the charging station 110. In an example, the electric vehicle 104 can determine to communicate based on a user setting to share data with the charging station 110. In other words, the electric vehicle 104 can opt out/in from communicating with the charging station. In some examples, the electric vehicle 104 can also include information to transmit data but not receive data or vice versa. Based on the user setting, the electric vehicle 104 can transmit a message to the charging station 110 to indicate that the electric vehicle 104 will communicatively couple with the charging station 110.

Based on the message, the electric vehicle 104 and the charging station 110 can exchange data. For example, the electric vehicle 104 can transmit a charging profile to the charging station 110. The charging profile can include charging data the electric vehicle 102 has stored over a period of time. Examples of the charging profile can include a battery charge level of the electric vehicle 104, information on a vehicle type (e.g., manufacturer make and model) of the electric vehicle 102 and or charging components of the electric vehicle 104, user information such as user identity, a direction of travel of the electric vehicle 104, charging operations (e.g., normal utility used for charging, length of charge, locations of charging stations used) of the electric vehicle 104.

After reception of the charging profile, the charging station 110 can perform one or more functions corresponding to the charging profile. For example, the charging station 110 can update collective station data to include some or all of the charging profile from the electric vehicle 104. As described in more detail below, the collective station data can include, for example, charging information related to the charging station and/or previous electric vehicles that exchanged data with the charging station. In another example, the charging station 110 can analyze the collective station data based on the charging profile to determine charging patterns between the charging pattern of the electric vehicle 104 and previous electric vehicles (e.g., electric vehicle 102). Further, the charging station 110 can upload the charging profile to a network 120 via the communication link 130 for the purpose of further analysis such as determination for potential locations of building new charging stations and comparing charging data of different vehicle manufactures (e.g., original equipment manufacturer (OEM) comparison). In some examples, the charging station 110 can use block chain technologies to distribute data.

Further, the charging station 110 can transmit collective station data to the electric vehicle 104. The collective station data can include any charging information related to the charging station 110 and/or previous electric vehicles (e.g., electric vehicle 102) that exchanged data with the charging station 110. In other words, the charging station 110 chains data acquired from the electric vehicles to form the collective station data, and shares the collective station data with subsequent electric vehicles.

For example, when the charging station 110 transmits the collective station data to the electric vehicle 104, the collective station data can include information on vehicle types (e.g., manufacturer make and model) of the electric vehicle 102 or previous electric vehicles, charging components of the electric vehicle 102 or previous electric vehicles, user information of the electric vehicle 102 or previous electric vehicles, direction of travel of the electric vehicle 102 or previous electric vehicles, and/or charging operations (e.g., normal utility used for charging, length of charge, locations of charging stations) used for the electric vehicle 102 or previous electric vehicles. As another example, when the charging station 110 transmits the collective station data to the electric vehicle 106, the collective station data can include information corresponding to the electric vehicles 102 and 104 and/or previous electric vehicles.

In an example, the electric vehicle 104 can analyze the collective charging data to determine potential patterns, including charging patterns, power saving patterns, and/or driving patterns of other electric vehicles, that can be implemented by the electric vehicle 104. Accordingly, after receipt of the collective charging data, the electric vehicle 104 can perform one or more functions corresponding to the collective charging data. As an example, the electric vehicle 104 can configure navigation data of a navigation system of the electric vehicle 104, configure charging data of a charging system of the electric vehicle 104, and/or update stored collective station data based on the collective station data from the charging station 110.

Figure 2:
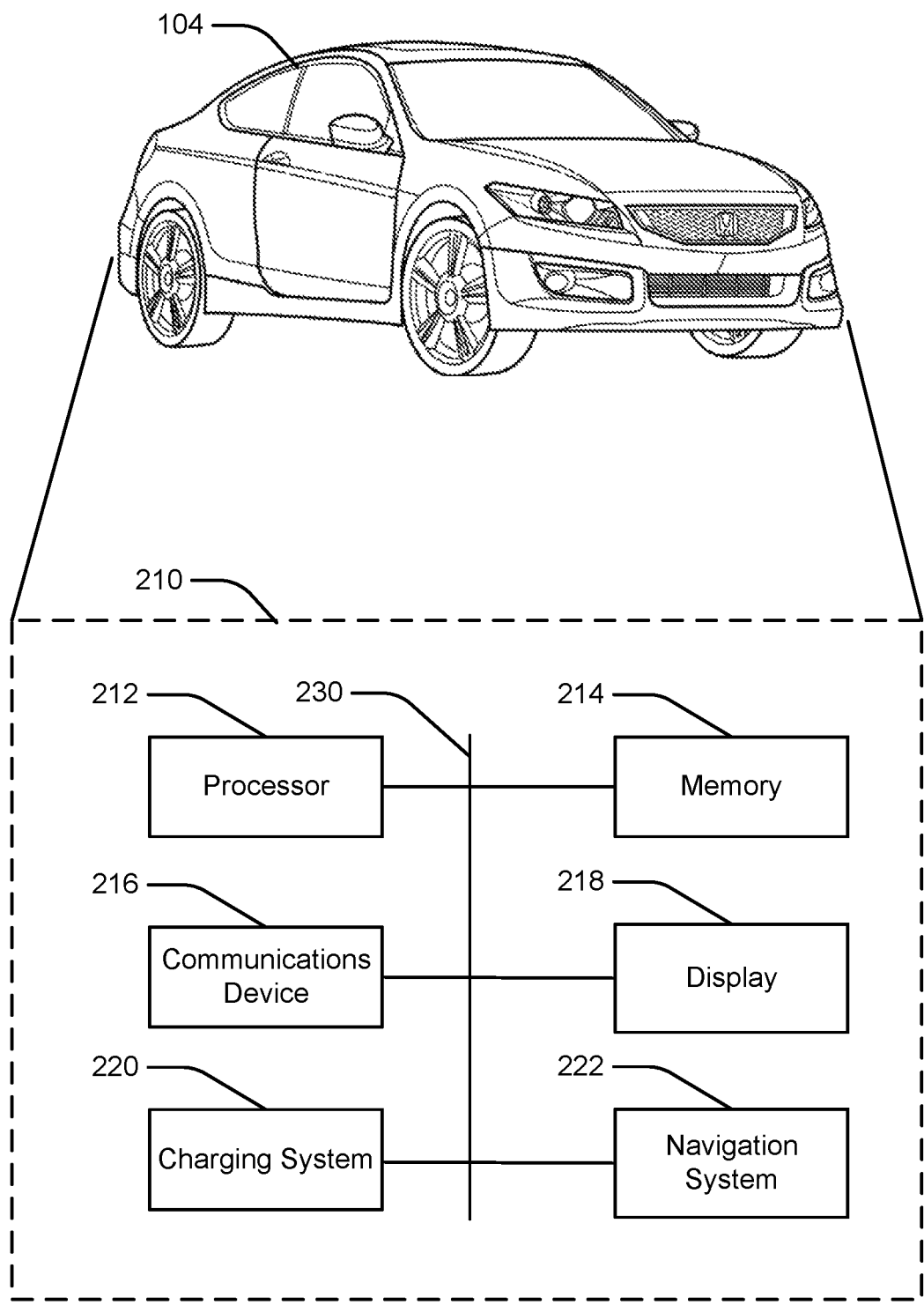
FIG. 2 illustrates a block view of an example electric vehicle, according to one aspect of the disclosure.

Referring to FIG. 2, an example of electric vehicle 104 having a charging profile system 210, according to aspects of the present disclosure, is described herein. In an aspect, the charging profile system 210 can at least partially reside and/or be implemented in the electric vehicle 104. Components of the charging profile system 210, as well as the components of other systems, hardware architectures and software architectures discussed herein, can be combined, omitted or organized into different architectures for various aspects of the disclosure. However, the example aspects and configurations discussed herein focus on the electric vehicle 104 as illustrated in FIG. 2, with corresponding system components and related methods.

The charging profile system 210 can include or be operably coupled with (or executed by) one or more processors 212 and one or more memories 214 that communicate to effectuate certain functions or actions, as described herein. For example, the charging profile system 210 can include a communications device 216, which can include substantially any wired or wireless device, or related modem, etc., for providing wired or wireless computer communications utilizing various protocols to send/receive electronic signals internally to features and systems within the electric vehicle 104 and/or to external devices. In an example, communications device 216 can communicate using one or more radio technologies (e.g., 3GPP radio access technologies, IEEE 802.11, Bluetooth®).

Additionally, the charging profile system 210 can include a display 218 for displaying one or more interfaces related to one or more charging profiles. For example, the display 218 can include a liquid crystal display (LCD) and/or variants thereof, plasma display, etc., and/or can be part of a touchscreen display.

The charging profile system 210 can additionally include or be operably coupled with a charging system 220 for determining a charging profile of the electric vehicle 104 based on one or more charging parameters, including, but not limited to, charging schedule (e.g., connection/disconnection to charging stations, start time, duration, etc.), charging locations, or charging patterns (e.g., battery level, charging speed, charging cost/rates) of the electric vehicle 104. The charging system 220 can generate the charging profile during driving or charging operations for the vehicle 104.

The charging profile system 210 can additionally include or be operably coupled with a navigation system 222 for determining navigation-related parameters, including, but not limited to, a location, direction of travel, speed, acceleration, etc. of the electric vehicle 104. In an example, the navigation-related parameters can also be based on collective charging data received from the charging station 110. In some examples, the navigation system 222 can include or can be operably coupled with a global positioning system (GPS) device (or other latitude/longitude determination device), a speedometer, an accelerometer, a gyroscope, and/or the like, to determine the navigation-related parameters.

The various components of the charging profile system 210 can be operably coupled to one another via one or more busses 230 to facilitate communication among the components to perform functions described herein.

In some examples, one or more of the components described for the charging profile system 210 can be part of another system. For example, the display 218 can be part of an infotainment system and/or navigation system 222 of the vehicle 104.

Figure 3:
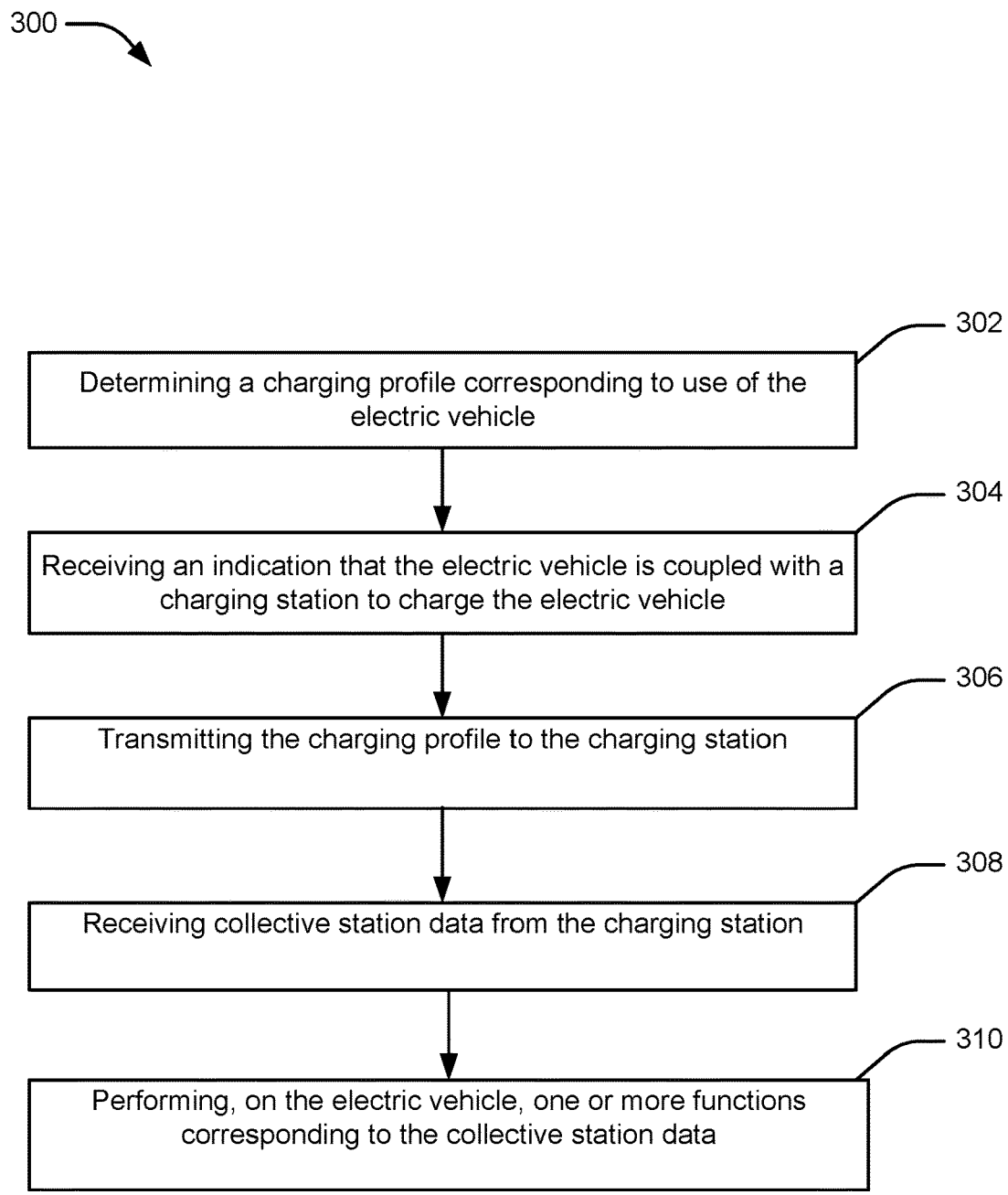
FIG. 3 illustrates a flowchart of an example method for chaining data by an electric vehicle, according to one aspect of the disclosure.

Referring now to FIG. 3, which is described in conjunction with the example operating environment 100 of FIG. 1, an example method 300 for chaining data by an electric vehicle, is illustrated. In an aspect, operations of the method 300 can be performed by one or more components (e.g., charging profile system 210, processor 212, memory 214, communications device 216, display 218, charging system 220, or navigation system 222) of the electric vehicle 104.

At 302, the method 300 can include determining a charging profile corresponding to use of the electric vehicle. In an aspect, the charging profile system 210 (e.g., in conjunction with processor 212, memory 214, communications device 216, charging system 220, and/or navigation system 222) determine a charging profile corresponding to use of the electric vehicle. In an example, the charging profile can be based on one or more charging parameters, including, but not limited to, charging schedule (e.g., start time, duration, etc.), charging locations, or charging patterns (e.g., battery level, charging speed, charging cost/rates) of the electric vehicle 104. The charging system 220 can generate the charging profile during driving or charging operations for the vehicle 104. Further, the charging profile can include charging data the electric vehicle 102 has stored over a period of time. Examples of the charging profile can include a battery charge level of the electric vehicle 104, information on a vehicle type (e.g., manufacturer make and model) of the electric vehicle 102 and or charging components of the electric vehicle 104, user information such as user identity, a direction of travel of the electric vehicle 104, charging operations (e.g., normal utility used for charging, length of charge, locations of charging stations used) of the electric vehicle 104.

At 304, the method 300 can include receiving an indication that the electric vehicle is coupled with a charging station to charge the electric vehicle. In an aspect, the charging profile system 210 (e.g., in conjunction with processor 212, memory 214, communications device 216, charging system 220, and/or navigation system 222) can receive an indication that the electric vehicle 104 is coupled with a charging station 110 to charge the electric vehicle. In some examples, the indication can be from the physical connection of the plug 112 to the electric vehicle 104, the initiation of charging with the electric vehicle 104, or one or more signals received from the electric vehicle 104.

At 306, the method 300 can include transmitting the charging profile to the charging station. In an aspect, the charging profile system 210 (e.g., in conjunction with processor 212, memory 214, communications device 216, charging system 220, and/or navigation system 222) can transmit the charging profile to the charging station 110.

In some aspects, the method 300 can optionally include determining the electric vehicle 104 will communicate with the charging station 110 to share data based on a user setting, as described herein. In some aspects, the method 300 can optionally include transmitting, in response to the receiving of the indication, a message to the charging station 110 to indicate the electric vehicle 104 will communicatively couple with the charging station 110, as described herein. In an example, the message can include the charging profile or can be separate from the charging profile.

At 308, the method 300 can include receiving collective station data from the charging station. In an aspect, the charging profile system 210 (e.g., in conjunction with processor 212, memory 214, communications device 216, charging system 220, and/or navigation system 222) can receive the collective station data from the charging station 110. In an example, the collective station data can include any charging information related to the charging station 110 and/or previous electric vehicles (e.g., electric vehicle 102) that exchanged data with the charging station 110. The collective station data can include information on vehicle types (e.g., manufacturer make and model) of the electric vehicle 102 or other previous electric vehicles, charging components of the electric vehicle 102 or other previous electric vehicles, user information of the electric vehicle 102 or other previous electric vehicles, direction of travel of the electric vehicle 102 or other previous electric vehicles, and/or charging operations (e.g., normal utility used for charging, length of charge, locations of charging stations) used of the electric vehicle 102 or other previous electric vehicles.

At 310, the method 300 can include performing, on the electric vehicle, one or more functions corresponding to the collective station data. In an aspect, the charging profile system 210 (e.g., in conjunction with processor 212, memory 214, communications device 216, charging system 220, and/or navigation system 222) can perform one or more functions corresponding to the collective station data. As an example, the electric vehicle 104 can configure navigation data of a navigation system 222 of the electric vehicle 104, configure charging data of a charging system 220 of the electric vehicle 104, and/or update stored collective station data based on the collective station data from the charging station 110.

Figure 4:
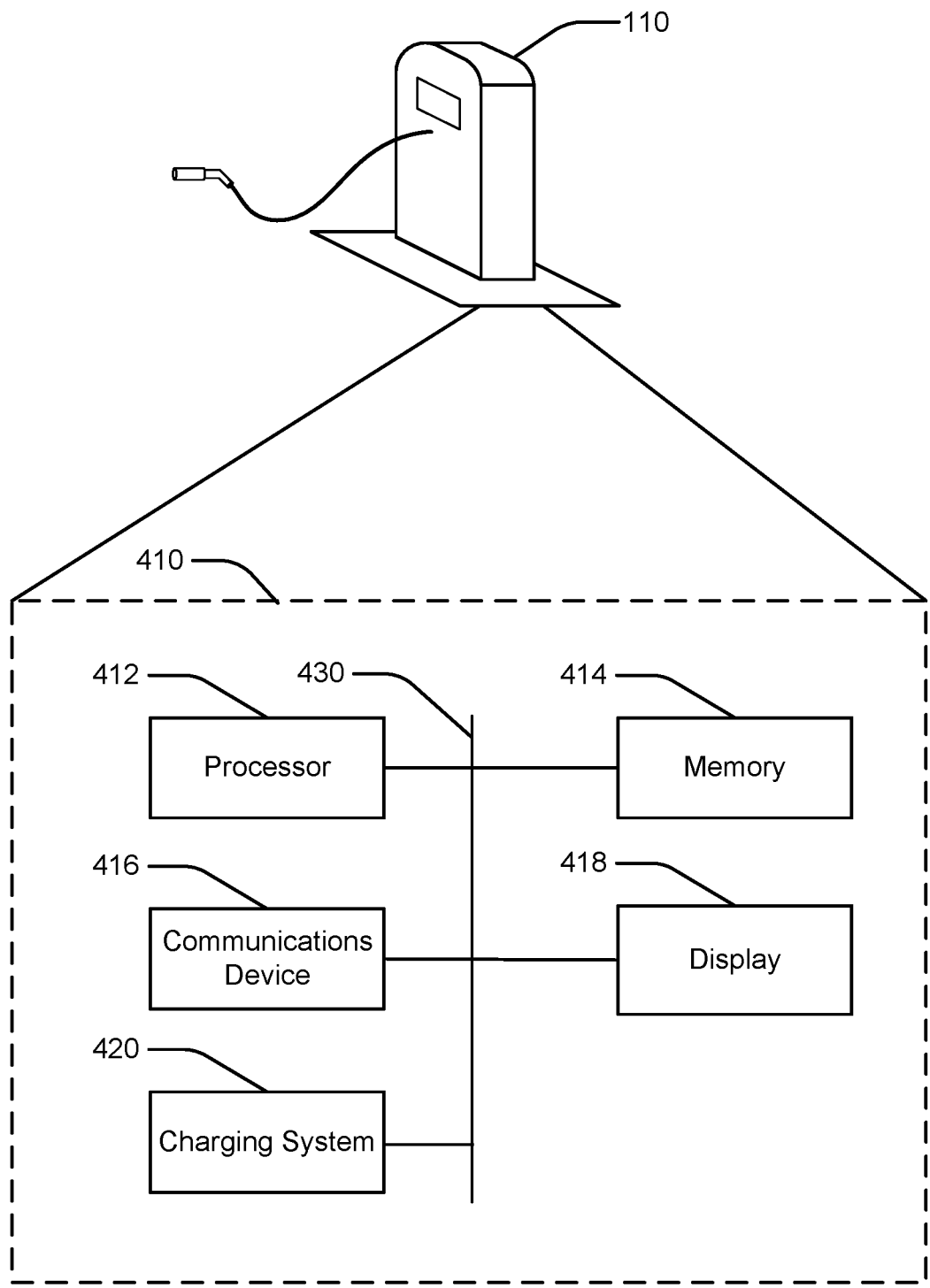
FIG. 4 illustrates a block view of an example charging station, according to one aspect of the disclosure.

Referring to FIG. 4, an example of the charging station having a collective charging data system 410, according to aspects of the present disclosure, is described herein. In an aspect, the collective charging data system 410 can at least partially reside and/or be implemented in the charging station 110. Components of the collective charging data system 410, as well as the components of other systems, hardware architectures and software architectures discussed herein, can be combined, omitted or organized into different architectures for various aspects of the disclosure. However, the example aspects and configurations discussed herein focus on the charging station 110 as illustrated in FIG. 4, with corresponding system components and related methods.

The collective charging data system 410 can include or be operably coupled with (or executed by) one or more processors 412 and one or more memories 414 that communicate to effectuate certain functions or actions, as described herein. For example, the collective charging data system 410 can include a communications device 416, which can include substantially any wired or wireless device, or related modem, etc., for providing wired or wireless computer communications utilizing various protocols to send/receive electronic signals internally to features and systems within the charging station 110 and/or to external devices. In an example, communications device 416 can communicate using one or more radio technologies (e.g., 3GPP radio access technologies, IEEE 802.11, Bluetooth®).

Additionally, the collective charging data system 410 can include a display 418 for displaying one or more interfaces related to one or more charging operations. For example, the display 418 can include a liquid crystal display (LCD) and/or variants thereof, plasma display, etc., and/or can be part of a touchscreen display.

The collective charging data system 410 can additionally include or be operably coupled with a charging system 220 for determining collective charging data of the charging station 110 and/or one or more electric vehicles (e.g., 102-106) based on one or more charging parameters of the electric vehicles. For example, the collective charging data can include information on vehicle types (e.g., manufacturer make and model) of previous electric vehicles (e.g., electric vehicle 102), charging components of previous electric vehicles, user information of previous electric vehicles, direction of travel of previous electric vehicles, and/or charging operations (e.g., normal utility used for charging, length of charge, locations of charging stations) used by previous electric vehicles.

The various components of the collective charging data system 410 can be operably coupled to one another via one or more busses 430 to facilitate communication among the components to perform functions described herein.

In some examples, one or more of the components described for the collective charging data system 410 can be part of another system.

Figure 5:
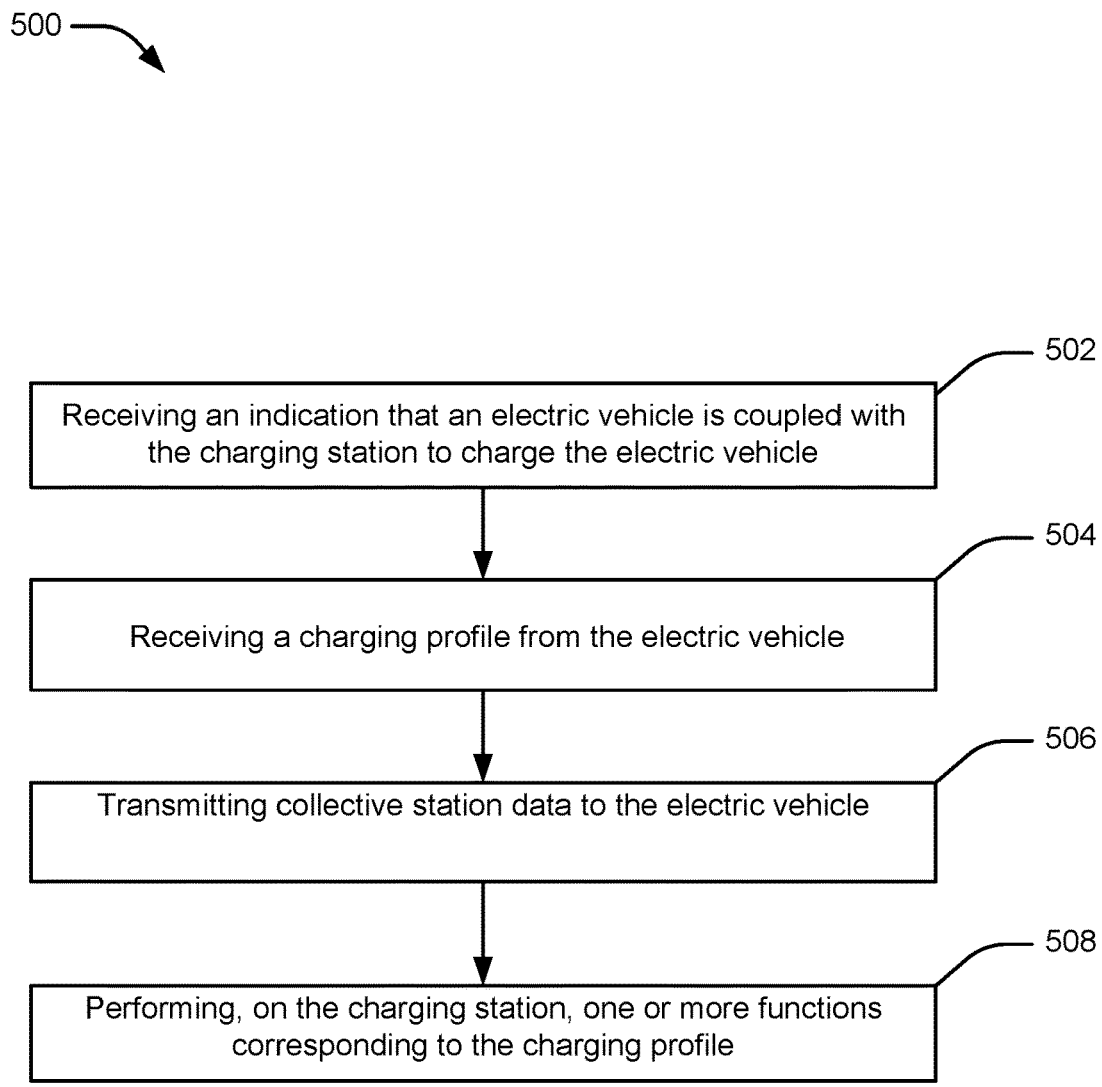
FIG. 5 illustrates a flowchart of an example method for chaining data by a charging station, according to one aspect of the disclosure.

Referring now to FIG. 5, which is described in conjunction with the example operating environment 100 of FIG. 1, an example method 500 for chaining data by a charging station, is illustrated. In an aspect, operations of the method 500 can be performed by one or more components (e.g., collective charging data system 410, processor 412, memory 414, communications device 416, display 418, or charging system 420) of the charging station 110.

At 502, the method 500 can include receiving an indication that an electric vehicle is coupled with the charging station to charge the electric vehicle. In an aspect, the collective charging data system 410 (e.g., in conjunction with processor 412, memory 414, communications device 416, and/or charging system 420) can receive an indication that the electric vehicle 104 is coupled with the charging station to charge the electric vehicle 104. In some examples, the indication can be from the physical connection of the plug 112 to the electric vehicle 104, the initiation of charging with the electric vehicle 104, or one or more signals received from the electric vehicle 104.

At 504, the method 500 can include receiving a charging profile from the electric vehicle. In an aspect, the collective charging data system 410 (e.g., in conjunction with processor 412, memory 414, communications device 416, and/or charging system 420) can receive a charging profile from the electric vehicle 104. The charging profile can include examples as described herein.

At 506, the method 500 can include transmitting collective station data to the electric vehicle. In an aspect, the collective charging data system 410 (e.g., in conjunction with processor 412, memory 414, communications device 416, and/or charging system 420) can transmit collective station data to the electric vehicle 104. In an example, the collective station data can include examples described herein.

At 508, the method 500 can include performing, on the charging station, one or more functions corresponding to the charging profile. In an aspect, the collective charging data system 410 (e.g., in conjunction with processor 412, memory 414, communications device 416, and/or charging system 420) can perform one or more functions corresponding to the charging profile. For example, the charging station 110 can update collective station data (describe in more detail below) to include some or all of the charging profile from the electric vehicle 104. In another example, the charging station 110 can analyze the collective station data based on the charging profile to determine charging patterns between the charging pattern of the electric vehicle 104 and previous electric vehicles (e.g., electric vehicle 102). Further, the charging station 110 can upload the charging profile to a network 120 via the communication link 130 for the purpose of further analysis such as determination for potential locations of building new charging stations and comparing charging data of different vehicle manufactures (e.g., OEM comparison). In some examples, the charging station 110 can use block chain technologies to distribute data.

In some aspects, the method 500 can optionally determine the electric vehicle 104 will communicate with the charging station 110 to share data, as described herein. In some aspects, the method 500 can optionally transmit, in response to receiving the indication, a message to the charging station 110 to indicate the electric vehicle 104 will communicatively couple with the charging station 110, as described herein.

Figure 6:
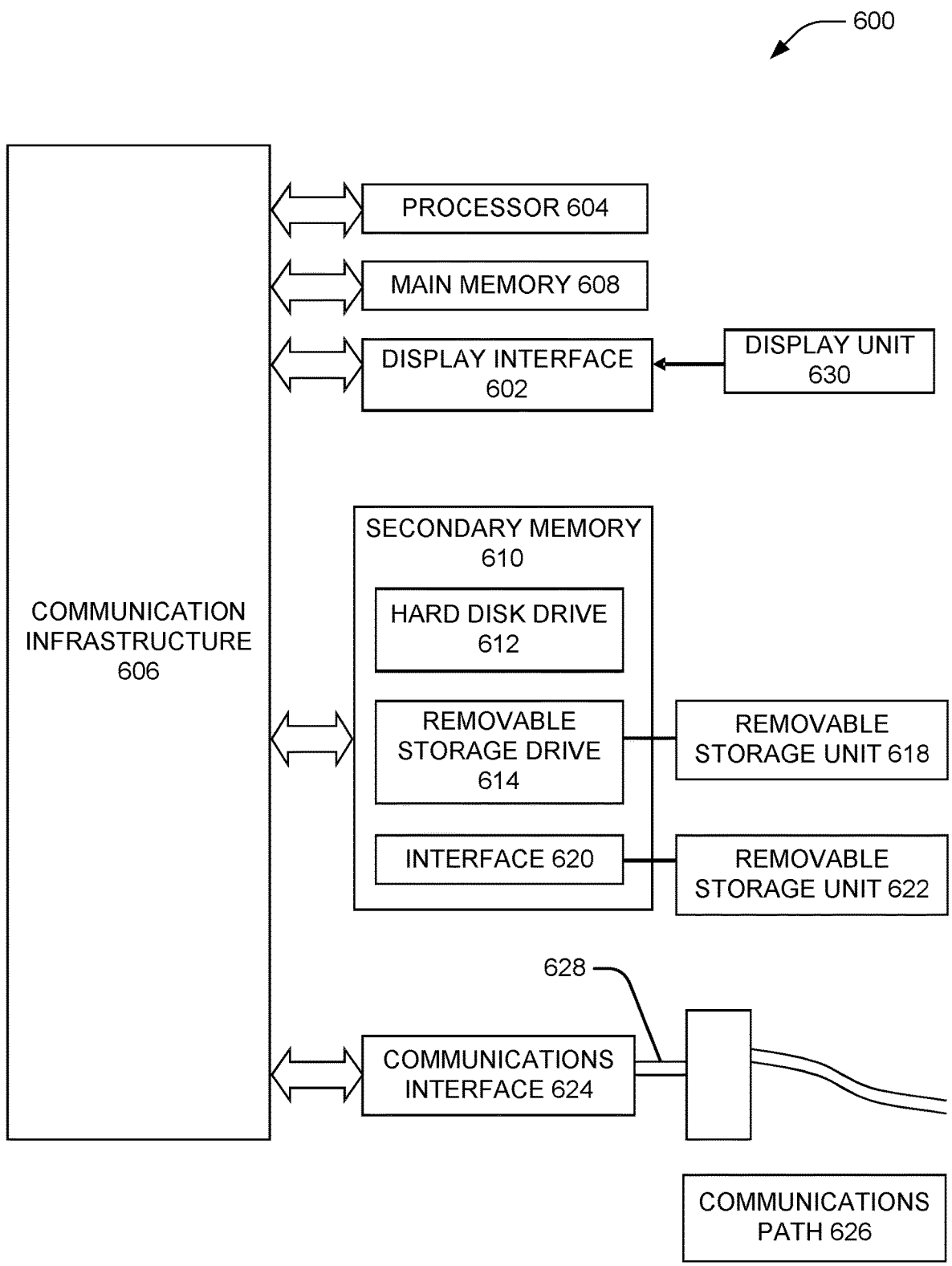
FIG. 6 presents an example system diagram of various hardware components and other features according to one aspect of the disclosure.

FIG. 6 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 600 is shown in FIG. 6.

The computer system 600 includes one or more processors, such as processor 604. The processor 604 is connected to a communication infrastructure 406 (e.g., a communications bus, cross-over bar, or network). The processor 604 can include the processor 212 or 412. Various software aspects are described in terms of this example computer system. After reading this description, it will become apparent to a person skilled in the relevant art(s) how to implement aspects described herein using other computer systems and/or architectures.

Computer system 600 can include a display interface 602 that forwards graphics, text, and other data from the communication infrastructure 606 (or from a frame buffer not shown) for display on a display unit 630. Display unit 630 can include display 218 or 418, in one example. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600. In an example, memory 214 or 414 can include one or more of main memory 608, secondary memory 610, removable storage drive 614, removable storage unit 618, removable storage unit 622, etc.

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628, which can be electronic, electromagnetic, optical or other signals capable of being received by communications interface 624. These signals 628 are provided to communications interface 624 via a communications path (e.g., channel) 626. This path 626 carries signals 628 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive, a hard disk installed in a hard disk drive, and/or signals 628. These computer program products provide software to the computer system 600. Aspects described herein can be directed to such computer program products. Communications device 216 or 416 can include communications interface 624.

Computer programs (also referred to as computer control logic) are stored in main memory 608 and/or secondary memory 610. Computer programs can also be received via communications interface 624. Such computer programs, when executed, enable the computer system 600 to perform various features in accordance with aspects described herein. In particular, the computer programs, when executed, enable the processor 604 to perform such features. Accordingly, such computer programs represent controllers of the computer system 600. Computer programs can include charging profile system 210 or collective charging data 410.

In variations where aspects described herein are implemented using software, the software can be stored in a computer program product and loaded into computer system 600 using removable storage drive 614, hard disk drive 612, or communications interface 620. The control logic (software), when executed by the processor 604, causes the processor 604 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 7:
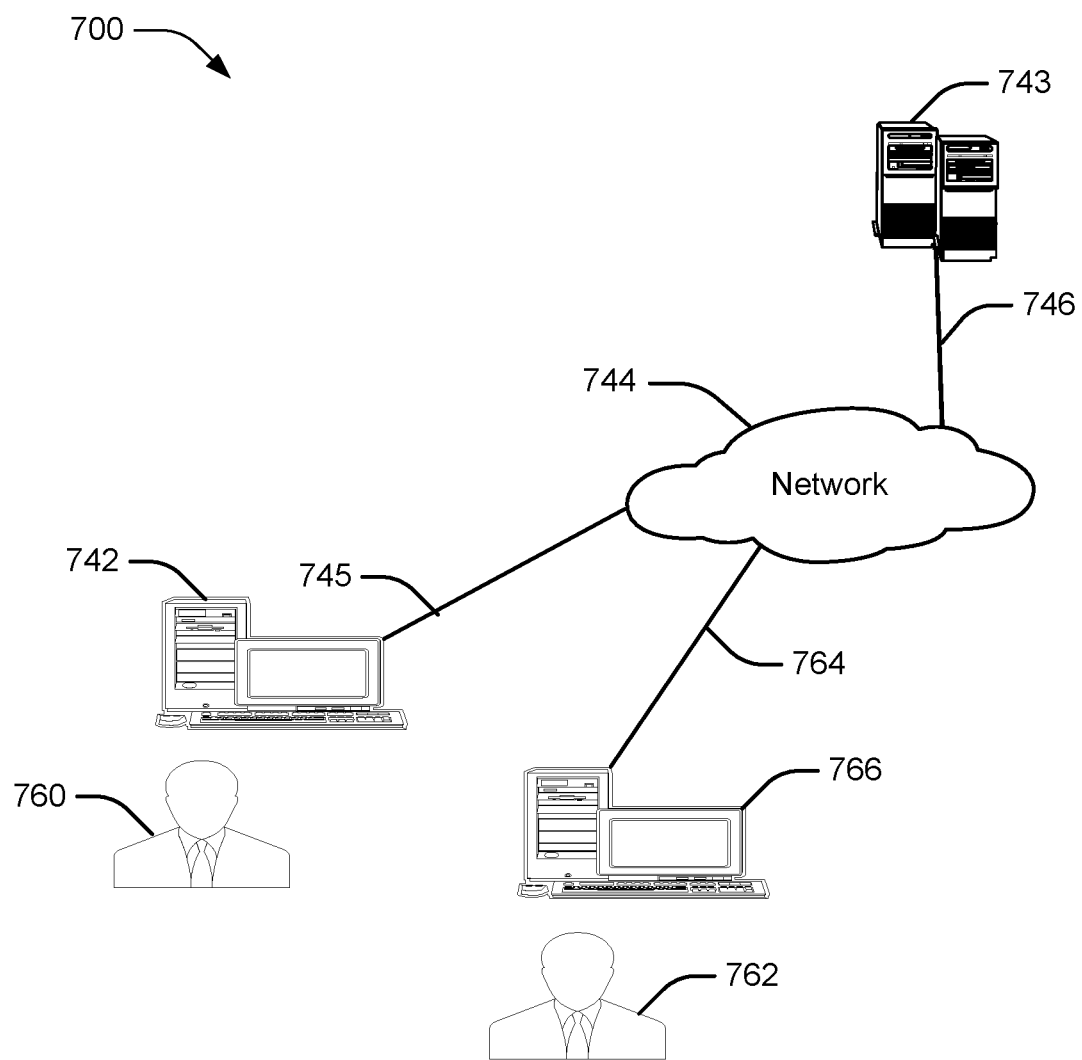
FIG. 7 is a block diagram of various example system components according to one aspect of the disclosure.

FIG. 7 is a block diagram of various example system components, in accordance with an aspect. FIG. 7 shows a communication system 700 usable in accordance with aspects described herein. The communication system 700 includes one or more users 760, 762 and one or more terminals 742, 766. For example, terminals 742, 766 can include vehicle 102, 104, 108 or charging station 110 or a related system, and/or the like. In one aspect, data for use in accordance with aspects described herein is, for example, input and/or accessed by users 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for chaining data by an electric vehicle, comprising:
   determining a charging profile corresponding to use of the electric vehicle;
   receiving an indication that the electric vehicle is coupled with a charging station to charge the electric vehicle;
   transmitting the charging profile to the charging station;
   receiving collective station data corresponding to a plurality of charging profiles received from a plurality of second electric vehicles previously coupled with the charging station;
   performing, on the electric vehicle, one or more functions corresponding to the collective station data based on the plurality of second electric vehicles; and
   updating the collective station data based on the charging profile received from the electric vehicle;
   wherein the updated collective station data is compiled from both the electric vehicle and the plurality of second electric vehicles previously coupled with the charging station.

2. The method of claim 1, wherein the charging profile includes information on one or more of a charge of the electric vehicle, a vehicle type of the electric vehicle, a user of the electric vehicle, a direction of travel of the electric vehicle, charging station locations used by the electric vehicle, or charging operations of the electric vehicle.

3. The method of claim 1, wherein the collective station data includes information on one or more of a vehicle type of one or more second electric vehicles, user information of the one or more second electric vehicles, direction of travel of the one or more second electric vehicles, charging station locations used by the one or more second electric vehicles, or charging operations of the one or more second electric vehicles.

4. The method of claim 1, wherein performing the one or more functions corresponding to the collective station data comprises:
   configuring navigation data of a navigation system of the electric vehicle based on the collective station data from the charging station.

5. The method of claim 1, wherein performing the one or more functions corresponding to the collective station data comprises:
   configuring charging data of a charging system of the electric vehicle based on the collective station data from the charging station.

6. The method of claim 1, wherein performing the one or more functions corresponding to the collective station data comprises:
   updating stored collective station data based on the collective station data from the charging station.

7. The method of claim 1, further comprising:
   determining the electric vehicle will communicate with the charging station to share data; and
   transmitting, in response to the receiving of the indication, a message to the charging station to indicate the electric vehicle will communicatively couple with the charging station.

8. An electric vehicle, comprising:
   a memory storing instructions; and
   a processor coupled with the memory and configured to execute the instructions to:
   determine a charging profile corresponding to use of the electric vehicle;
   receive an indication that the electric vehicle is coupled with a charging station to charge the electric vehicle;
   transmit the charging profile to the charging station;
   receive collective station data corresponding to a plurality of charging profiles received from a plurality of second electric vehicles previously coupled with the charging station;
   perform one or more functions corresponding to the collective station data based on the plurality of second electric vehicles; and
   update the collective station data based on the charging profile received from the electric vehicle;
   wherein updated collective station data is compiled from both the electric vehicle and the plurality of second electric vehicles previously coupled with the charging station.

9. The electric vehicle of claim 8, wherein the processor is further configured to execute the instructions to:
   configure navigation data of a navigation system of the electric vehicle based on the collective station data from the charging station.

10. The electric vehicle of claim 8, wherein the processor is further configured to execute the instructions to:
    configure charging data of a charging system of the electric vehicle based on the collective station data from the charging station.

11. The electric vehicle of claim 8, wherein the processor is further configured to execute the instructions to:
    update stored collective station data based on the collective station data from the charging station.

12. The electric vehicle of claim 8, wherein the processor is further configured to execute the instructions to:
    determine the electric vehicle will communicate with the charging station to share data; and
    transmit, in response to receiving the indication, a message to the charging station to indicate the electric vehicle will communicatively couple with the charging station.

13. A method of chaining data by a charging station, comprising:
    receiving an indication that an electric vehicle is coupled with the charging station to charge the electric vehicle;
    receiving a charging profile from the electric vehicle;
    transmitting collective station data corresponding to a plurality of charging profiles received from a plurality of second electric vehicles previously coupled with the charging station to the electric vehicle;
    performing, on the charging station, one or more functions corresponding to the charging profile; and
    updating the collective station data based on the charging profile received from the electric vehicle;
    wherein the updated collective station data is compiled from both the electric vehicle and the plurality of second electric vehicles previously coupled with the charging station.

14. The method of claim 13, wherein the charging profile is based at least in part on one or more of a charge of the electric vehicle, a vehicle type of the electric vehicle, a user of the electric vehicle, a direction of travel of the electric vehicle, charging station locations used by the electric vehicle, or methods of charging the electric vehicle.

15. The method of claim 13, wherein the collective station data includes information on one or more of a charge of a second electric vehicle, a vehicle type of the second electric vehicle, a user of the second electric vehicle, a direction of travel of the second electric vehicle, charging station locations used by the second electric vehicle, or methods of charging the second electric vehicle.

16. The method of claim 13, wherein performing the one or more functions corresponding to the charging profile comprises:
   updating the collective station data based on the charging profile from the electric vehicle.

17. The method of claim 13, wherein performing the one or more functions corresponding to the charging profile comprises:
   analyzing the collective station data based on the charging profile.

18. The method of claim 13, further comprising:
   receiving a message from the electric vehicle to indicate the electric vehicle will communicatively couple with the charging station.

* * * * *